United States Patent
Zhang

(10) Patent No.: US 9,664,295 B2
(45) Date of Patent: May 30, 2017

(54) CONCENTRATED TYPE CONTROL VALVE

(71) Applicant: Xiamen Runner Industrial Corporation, Xiamen (CN)

(72) Inventor: Ronggui Zhang, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 15/015,422

(22) Filed: Feb. 4, 2016

(65) Prior Publication Data

US 2016/0319949 A1    Nov. 3, 2016

(30) Foreign Application Priority Data

Apr. 28, 2015    (CN) .................... 2015 2 0263906 U

(51) Int. Cl.
*G05D 11/00*    (2006.01)
*F16K 11/07*    (2006.01)

(52) U.S. Cl.
CPC .................................. *F16K 11/07* (2013.01)

(58) Field of Classification Search
CPC ..... F16K 11/07; F16K 19/00; Y10T 137/2703
USPC .......... 137/87.03, 109, 111, 115.01, 115.03, 137/115.23, 597, 605
See application file for complete search history.

(56) References Cited

U.S. PATENT DOCUMENTS

| | | | | |
|---|---|---|---|---|
| 4,535,797 A | * | 8/1985 | Rosaen | F16K 17/00 137/110 |
| 6,240,949 B1 | * | 6/2001 | Gerstenberger | F15B 11/17 137/109 |
| 6,926,205 B2 | * | 8/2005 | Taylor | G05D 23/134 137/109 |
| 2005/0028864 A1 | * | 2/2005 | Thrash, Jr. | F16K 3/265 137/112 |
| 2010/0154896 A1 | * | 6/2010 | Thrash, Jr. | F16K 11/044 137/112 |

* cited by examiner

*Primary Examiner* — Reinaldo Sanchez-Medina
(74) *Attorney, Agent, or Firm* — Chun-Ming Shih

(57) ABSTRACT

A concentrated type control valve includes a valve seat, with its lower portion provided with a first water port, a second water port, and a third water port, while its upper portion is provided with a fourth water port in communication with mixed water, wherein on a side of the valve seat is provided with a total water output port connected and in communication with water routes of the third water port and the fourth water port, the first water port is in communication with a cold water pipe, the second water port is connected to a water inlet port of a water processor, and the third water port is connected to a water output port of the water processor; and a movable central bolt, disposed in the fourth water port of the valve seat.

3 Claims, 3 Drawing Sheets

CONCENTRATED TYPE CONTROL VALVE

BACKGROUND OF THE INVENTION

Field of the Invention

The present invention relates to a control valve, and in particular to a concentrated type control valve.

The Prior Arts

Water channel control device is utilized quite often in the water supply equipment. However, it is rather unusual to use control valve core to control operations of various water channels at the same time. For a few such control valve cores that do exist, their structures are quite complicated, not easy to control and manipulate, thus adversely affecting their functions and applications.

Therefore, presently, the design and performance of the control valve core is not quite satisfactory, and it has much room for improvement.

SUMMARY OF THE INVENTION

In view of the problems and drawbacks of the prior art, the present invention provides a concentrated type control valve, comprising: a valve seat, and a movable central bolt. Wherein, the valve seat is provided with a lower portion having a first water port, a second water port, and a third water port, while its upper portion is provided with a fourth water port in communication with mixed water. On a side of the valve seat is provided with a total water output port connected and in communication with the water routes of the third water port and the fourth water port. The first water port is in communication with a cold water pipe, the second water port is connected to a water inlet port of a water processor, and the third water port is connected to a water output port of the water processor. And the movable central bolt is disposed in the fourth water port of the valve seat, while a lower portion of the movable central bolt is in the water routes of the first water port and the second water port.

The movable central bolt includes a movable column, a lower end of the movable column is in the valve seat on a side of the first water port, a seal ring is provided around the movable column, and a round seal plate is provided on an upper portion of the movable column, and in the valve seat on the side of the fourth water port.

A check valve is disposed on the valve seat, and is connected to the water route of the fourth water port, while a press tight nut is installed on the check valve.

The advantages of the present invention are that, it is simple in structure, easy to control and manipulate, capable of controlling two water routes at the same time, in achieving the objective of water route control.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
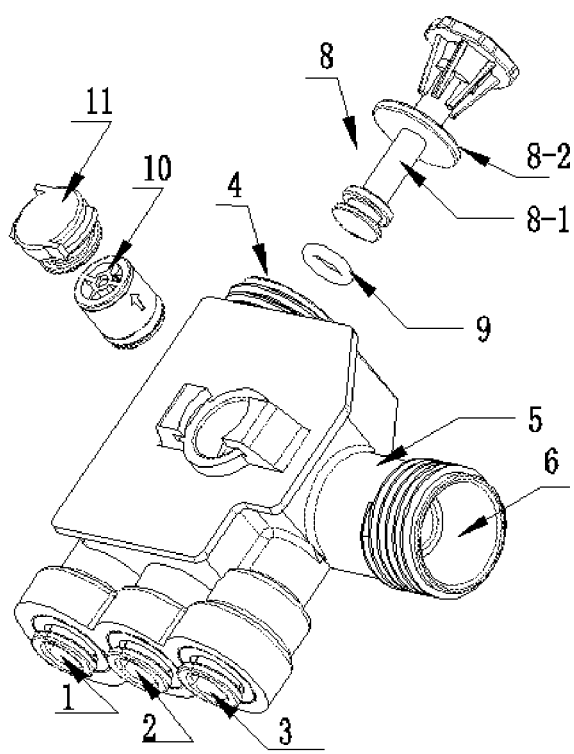
FIG. 1 is an exploded view of a structure of a concentrated type control valve according to an embodiment of the present invention.
Figure 2:
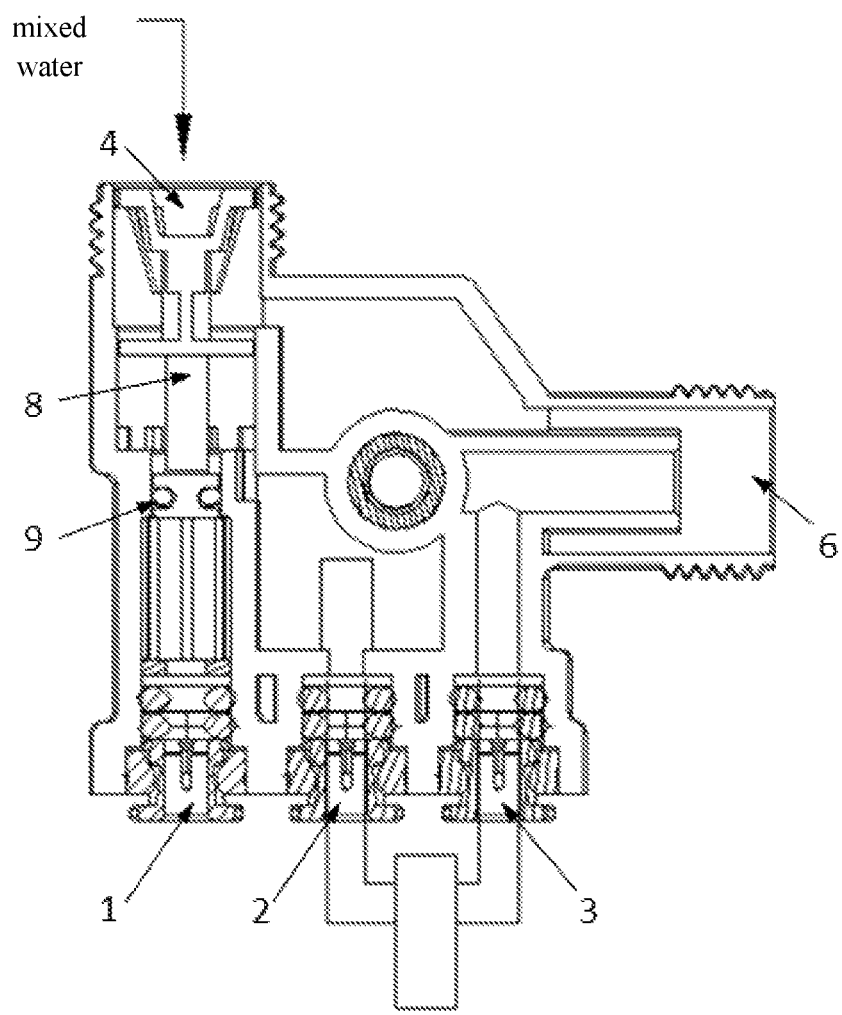
FIG. 2 is a cross section view of a structure of a concentrated type control valve when the mixed water is closed according to an embodiment of the present invention.
Figure 3:
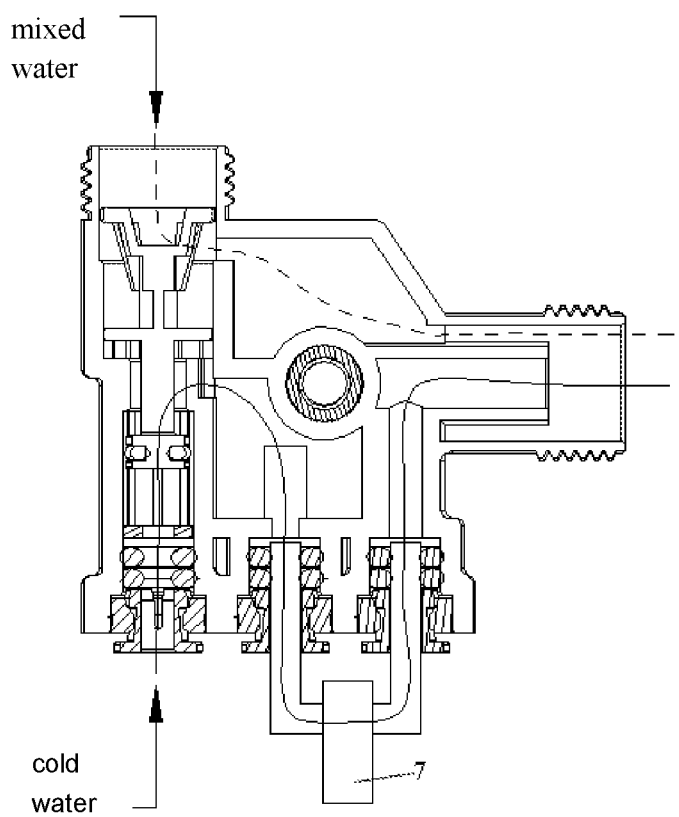
FIG. 3 is a cross section view of a structure of a concentrated type control valve when the mixed water is opened according to an embodiment of the present invention.

Refer to FIGS. 1 to 3 respectively for an exploded view of a structure of a concentrated type control valve according to an embodiment of the present invention; a cross section view of a structure of a concentrated type control valve when the mixed water is closed according to an embodiment of the present invention; and a cross section view of a structure of a concentrated type control valve when the mixed water is opened according to an embodiment of the present invention.

As shown in FIGS. 1 to 3, the concentrated type control valve includes: a valve seat 5 and a movable central bolt 8. Wherein, the valve seat 5 is provided with a lower portion having a first water port 1, a second water port 2, and a third water port 3, while its upper portion is provided with a fourth water port 4 in communication with mixed water. On a side of the valve seat 5 is provided with a total water output port 6 connected and in communication with water routes of the third water port 3 and the fourth water port 4. The first water port 1 is in communication with a cold water pipe, the second water port 2 is connected to a water inlet port of a water processor 7, and the third water port 3 is connected to a water output port of the water processor 7. And a movable central bolt 8 is disposed in the fourth water port 4 of the valve seat 5, while a lower portion of the movable central bolt 8 is in the water routes of the first water port 1 and the second water port 2. When the fourth water port 4 is subjected to water pressure, the movable central bolt 8 will move downward, to open the first water port 1. When the first water port 1 is closed, the movable central bolt 8 will move upward due to the pressure on the front end of the first water port 1, to close the first water port 1.

The movable central bolt 8 includes a movable column 8-1, a lower end of the movable column 8-1 is in the valve seat 5 on a side of the first water port 1. A seal ring 9 is provided around the movable column 8-1, and a round seal plate 8-2 is provided on an upper portion of the movable column 8-1, and in the valve seat 5 on the side of the fourth water port 4.

A check valve 10 is disposed on the valve seat 5, and is connected to the water route of the fourth water port 4, while a press tight nut 11 is installed on the check valve 10.

The operations of the concentrated type control valve are described in detail as follows:

1. The mixed water is controlled by a mixed water switch, so that cold water is connected and in direct communication with a water supply pipe.

2. When the mixed water switch is opened, under the pressure of the mixed water, the movable central bolt 8 moves downward, such that cold water enters into a water processor 7 through the valve seat 5.

3. When the mixed water switch is closed, under the pressure of cold water, the movable central bolt 8 moves upward, to cut off the route between the cold water supply and the water processor 7.

4. The check valve 10 is used to release pressure in a single direction, to ensure that pressure in the cold water route not always remains high.

Through control of water route, the concentrated type control valve of the present invention is capable of controlling two water routes at the same time, thus having a good prospect in the market.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A concentrated type control valve, comprising:
   a valve seat having a lower portion provided with a first water port, a second water port, and a third water port, and having an upper portion provided with a fourth water port in communication with a mixed water, wherein on a side of the valve seat is provided with a total water output port connected and in communication with water routes of the third water port and the fourth water port, the first water port is in communication with a cold water pipe, the second water port is connected to a water inlet port of a water processor, and the third water port is connected to a water output port of the water processor; and
   a movable central bolt, disposed in the fourth water port of the valve seat, wherein a lower portion of the movable central bolt is in the water routes of the first water port and the second water port.

2. The concentrated type control valve as claimed in claim 1, wherein the movable central bolt includes a movable column, a lower end of the movable column is in the valve seat on a side of the first water port, a seal ring is provided around the movable column, and a round seal plate is provided on an upper portion of the movable column, and in the valve seat on the side of the fourth water port.

3. The concentrated type control valve as claimed in claim 1, further comprising: a check valve, disposed on the valve seat, and connected to the water route of the fourth water port.

* * * * *